US012611356B1

(12) United States Patent
Crawley, IV

(10) Patent No.: US 12,611,356 B1
(45) Date of Patent: Apr. 28, 2026

(54) FOOT THERAPY DEVICE

(71) Applicant: Ira Crawley, IV, Pleasant Plain, OH (US)

(72) Inventor: Ira Crawley, IV, Pleasant Plain, OH (US)

( * ) Notice: Subject to any disclaimer, the term of this patent is extended or adjusted under 35 U.S.C. 154(b) by 1007 days.

(21) Appl. No.: 17/565,045

(22) Filed: Dec. 29, 2021

(51) Int. Cl.
*A61H 15/00* (2006.01)

(52) U.S. Cl.
CPC . *A61H 15/0078* (2013.01); *A61H 2015/0014* (2013.01); *A61H 2201/1215* (2013.01); *A61H 2201/164* (2013.01); *A61H 2201/5097* (2013.01)

(58) Field of Classification Search
CPC ........ A61H 15/0078; A61H 2015/0014; A61H 2201/1215; A61H 2201/164; A61H 2201/5097; A61H 15/00; A61H 2015/0071; A61H 15/02; A61B 17/54; A61B 2017/320004; A45D 2200/1054; A61Q 19/00
See application file for complete search history.

(56) References Cited

U.S. PATENT DOCUMENTS 6,050,270 A * 4/2000 Tyshenko, Jr. ......... A45D 29/05 15/34
6,178,970 B1 1/2001 Purifoy et al.
8,545,516 B1 * 10/2013 Winnett ................. A61B 17/54 606/131
8,763,188 B2 * 7/2014 Dombro ................. A46B 13/02 15/36
9,609,984 B1 4/2017 Kelly
10,716,595 B1 * 7/2020 Situ ........................ A61B 17/54
2013/0345609 A1 * 12/2013 Miller .................... A61H 15/00 601/120
2017/0360650 A1 * 12/2017 DiBenedetto .......... A61H 15/00
2020/0206070 A1 * 7/2020 Wu .................... A61H 15/0078
2021/0085555 A1 * 3/2021 Davis ..................... A61H 23/00
2021/0275224 A1 * 9/2021 Liu ........................ A45D 29/00

* cited by examiner

*Primary Examiner* — Victoria Murphy
*Assistant Examiner* — Kris Hanyu Gong
(74) *Attorney, Agent, or Firm* — Sanchelima & Associates, P.A.; Jesus Sanchelima; Christian Sanchelima

(57) ABSTRACT

A foot therapy device including a housing assembly, a foot file assembly, and an electrical assembly. The housing assembly includes a housing with a suction anchor to be adhere to a surface. The foot file assembly includes file members having a truncated conic shape that are received by said housing. In one embodiment said file members are made of pumice stone. In other embodiment said file members are made of bead rollers. The electrical assembly includes a motor embedded within said housing. The motor rotates the file members clockwise and counterclockwise. The cones are configured to massage, remove dead skin, and callouses to the sole of the foot.

16 Claims, 5 Drawing Sheets

FOOT THERAPY DEVICE

BACKGROUND OF THE INVENTION

1. Field of the Invention

The present invention relates to a foot therapy device and, more particularly, to a foot therapy device that includes file members having a truncated conic shape that provides massages and remove dead skin and calluses from the sole of a foot.

2. Description of the Related Art

Several designs for a foot therapy device have been designed in the past. None of them, however, include a waterproof base capable of being adhered to a surface and file members attached to the base for taking care of the sole of a foot, the file members are capable of rotate clockwise and counterclockwise, as well as changing the speed of the rotation.

Applicant believes that a related reference corresponds to U.S. Pat. No. 6,178,970 issued for a portable personal grooming appliance for removing calluses and rough skin from the feet by sanding. Applicant believes that another related reference corresponds to U.S. Pat. No. 9,609,984 issued for a foot scrubber and a method of scrubbing a foot. However, none of these references teaches a foot therapy device including a base with an integral motor and two counter-rotating spindles which hold conical pumice stones Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a foot therapy device that removes foot callus and dead skin easily, quickly, safely, and conveniently.

It is another object of this invention to provide a foot therapy device that includes a suction base for stabilizing the device on the floor or tub that makes the device more practical for older or otherwise less-flexible users.

It is still another object of the present invention to provide a foot therapy device that is waterproof.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
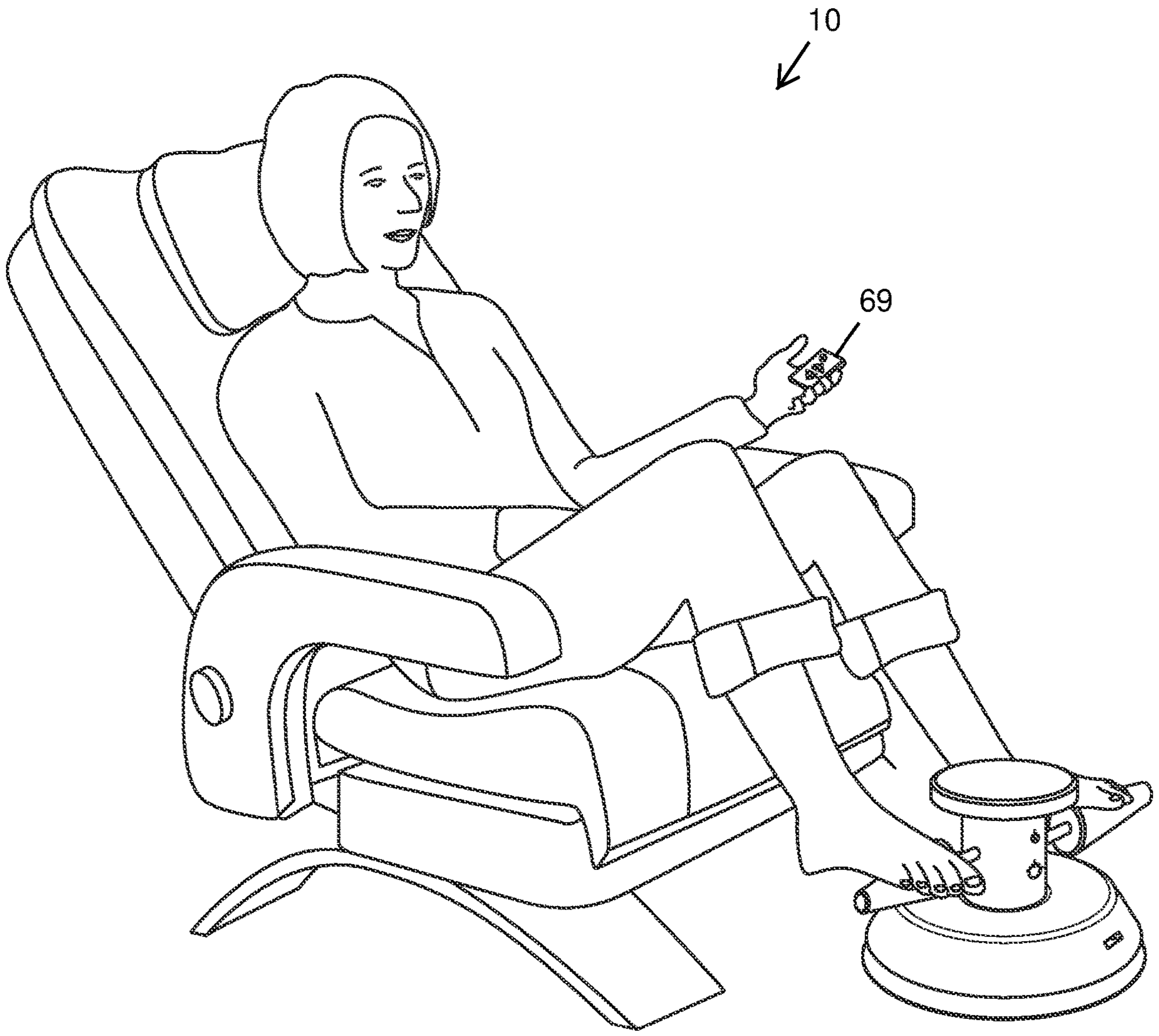
FIG. 1 represents an isometric operational view of the present invention 10 wherein a user is placing her or his feet onto the file members 42 for massaging the feet. The user is holding a remote controller 69 for controlling the features of the foot therapy device 10.

Referring now to the drawings, where the present invention is generally referred to with numeral 10, it can be observed that it basically includes a base assembly 20, a foot file assembly 40, and an electrical assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The housing assembly 20 includes a housing 22 and an attaching member 23. Said housing 22 further includes a base portion 24, a central portion 25, and a top portion 26. Said housing 22 is made of a lightweight, sturdy, durable material. Said housing may be made of acrylic, polycarbonate, polyethylene, polypropylene, polyethylene terephthalate, polyvinyl chloride, acrylonitrile-butadiene-styrene, wood, metal, or any variation thereof. Said housing 22 is volumetric. Housing 22 may be hollow. Said base portion 24 may be made of the same materials as the housing 22. Base portion 24 has a truncated cone shape. In other embodiments said base portion 24 may have a cube shape, a triangular prism shape, a cylindrical shape, a cuboid shape, an irregular shape, or any variation thereof. Base portion 24 further includes a base surface 24*a*. The central portion 25 may be made of the same material as the housing 22. Central portion 25 is mounted onto the base 24. Central portion 25 has an elongated cylindrical shape. However, in other embodiments said central portion 25 may have an elongated cuboid shape, an elongated hexagonal prism, or any variation of an elongated prism. Said central portion 25 is hollow. Central portion 25 further includes openings 25*a*. Openings 25*a* have a circular shape, nonetheless, in other embodiments the openings 25*a* may have a rectangular shape, a hexagonal shape, an oval shape, or any variation thereof. Openings 25*a* are located on lateral sides of the central portion 25. Openings 25*a* are centered on the lateral sides. Top portion 26 is mounted onto said central portion 25. Top portion 26 may be made of the same material as the housing 22. Top portion 26 has a substantially circular shape. In a preferred embodiment said housing 22 is coated with a material that resist liquid water passing through, suitable materials for this purpose may be rubber, wax, polytetrafluoroethylene, or the like. The housing 22 coated with a material that resist liquid water passing through configures a waterproof housing. The attaching member 23 permit to hold the housing 22 in a fixed position. Attaching member 23 is located on the base surface 24*a*. In a suitable embodiment said attaching member 23 is a suction anchor. In other embodiments the attaching member 23 may be a hook and loop fasteners, adhesive strips, plastic suction cups, or any variation thereof.

Figure 2:
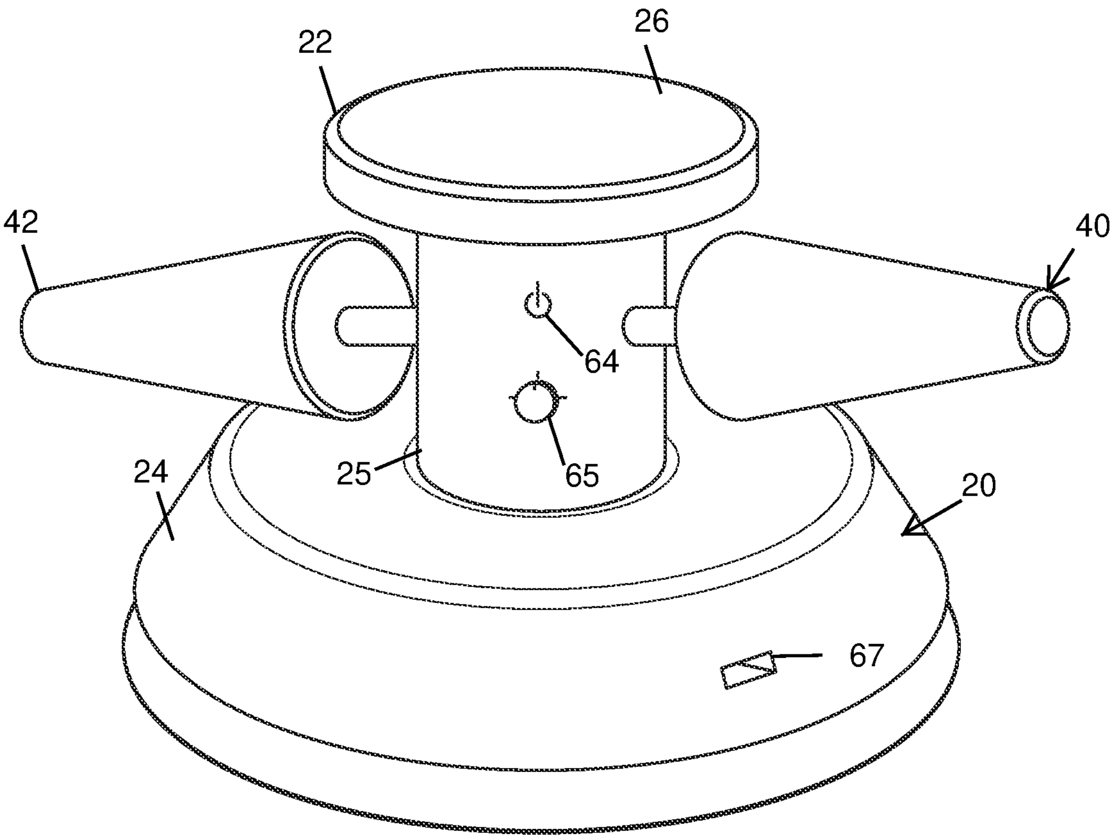
FIG. 2 shows an isometric view of the housing assembly 20 having a housing 22 with a base 24, a central portion 25, and a top portion 26. The file members 42 from the foot file assembly 40 are depicted. The power button 64 for turning on and off the invention; the selector button 65 for chose a preconfigured rotational speed of the file members 42; and the charging port 67 are also shown.
Figure 3:
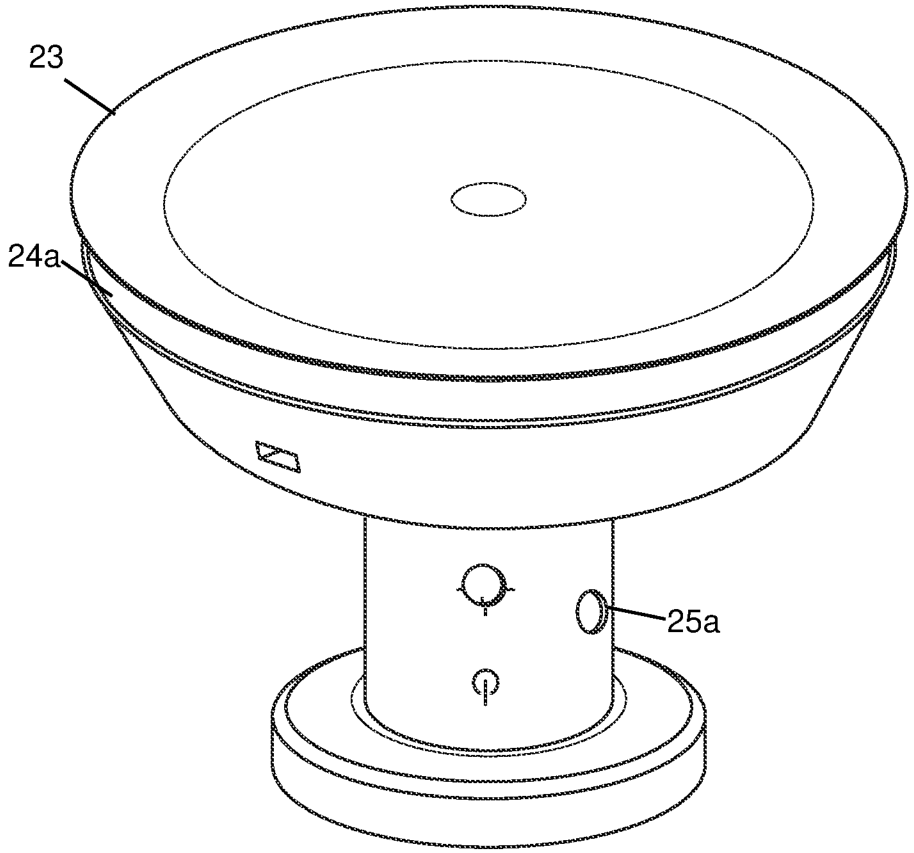
FIG. 3 illustrates a reverse isometric view of the housing 22 having an attaching member 23 that is a suction anchor for adhering the housing 22 to a surface.

Foot file assembly 40 includes file members 42. File members 42 further include shafts 43. File members 42 have a truncated conical shape. Nevertheless, in other embodiments said file members 42 may have a cylindrical shape, a cuboid shape, an undulating shape, a conic shape, or any variation of the aforementioned shapes. File members 42 are attached to the housing 22 at said openings 25*a*. Shafts 43 are attached to said file members 42. Shafts 43 have an elongated shape that conforms the shape of the openings 25*a*. Shafts 43 are capable of being attached and detached from the openings 25*a*. In a suitable embodiment file members 42 are made of pumice stone defining pumice stone file members 42*a*. File members 42 may have different embodiments each being made of different materials for different purposes. In different embodiments file members 42 may be made of a coarse grit material, a medium grit material, a fine grit material, a very fine grit material, or the like. FIG. 4*b* shows an alternative embodiment wherein the file members 42 are made of bead rollers for massaging a sole of a foot defining bead rollers file members 42. FIG. 2 shows the file members 42 mounted on the central portion 25.

Figure 4A:
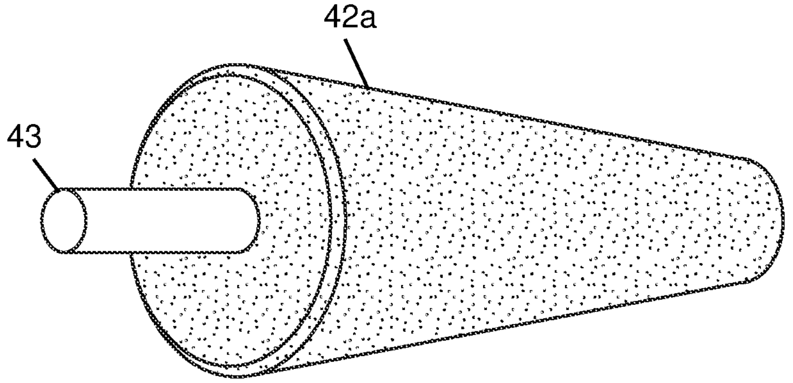
FIG. 4*a* is an isometric view of one embodiment of the file members 42 being made of pumice stone having a predetermined grade of filing surface.
Figure 4B:
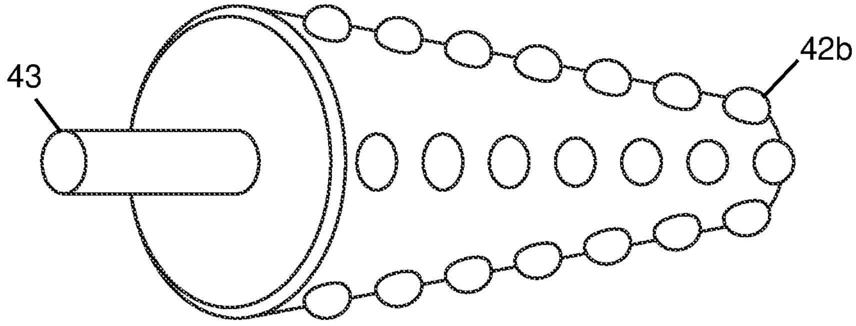
FIG. 4*b* is an isometric view of the file members 42 having bead rollers.
Figure 5:
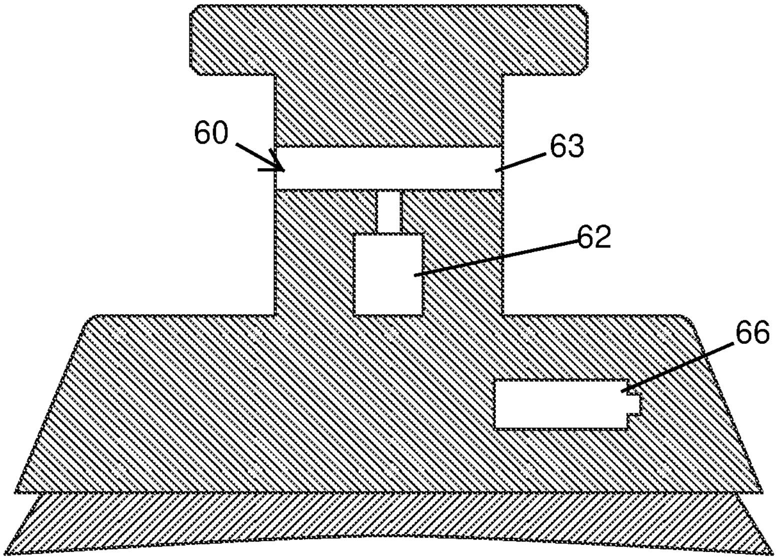
FIG. 5 is a cross section of the housing 22 showing the electrical assembly 60. The motor 62, the transmission system 63 and the power cell 66 are shown.
Figure 6:
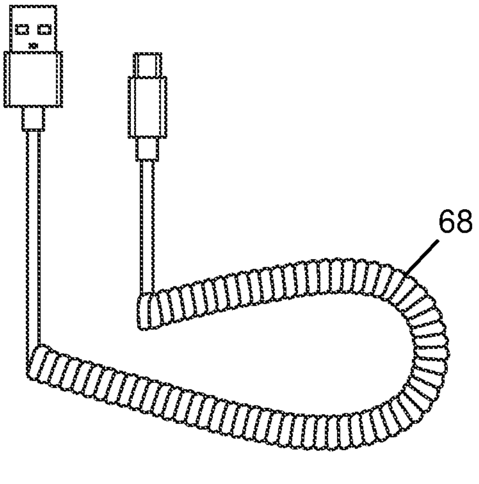
FIG. 6 is an isometric view of the charging cord 68.

Referring to FIG. 4*a* it is shown the file members 42 made of pumice stone for removing dead skin and calluses. In one embodiment said file member may have a predetermined grade of file. It should be understood that said file members 42 further include a variety of grades of files. For instance, said file member 42 may have a grade of file suitable for softly removing dead skin, whereas a file member 42 with another predetermined grade of file may be suitable for removing calluses. In a suitable embodiment the file members 42 may include 5 types of predetermined grades of files that may be used case dependent.

The electrical assembly 60 includes a motor 62, a transmission system 63, a power button 64, a selector button 65, a power cell 66, a charging port 67, and a charging cord 68. Said motor 62 is in the central portion 25. In a suitable embodiment the motor 62 may be driven by direct current, however, motor 62 may be driven by alternating current. Motor 62 generates a rotational motion. Motor 62 is connected internally to the openings 25*a* by means of the transmission system 63. Transmission system 63 carry the rotational motion generated by the motor 62. When the file members 42 are attached to the central portion 25 by the openings 25*a*, the transmission system 63 rotates the file members 42. Transmission system 63 is capable of rotating file members 42 clockwise and counterclockwise. Power button 65 is located on the central portion 25 as depicted in FIG. 2. Power button 64 may be a toggle switch, a push-button switch, a selector switch, or the like. In a suitable embodiment the power button 64 may be a toggle switch. Power button 64 activates or deactivates the motor 62. Selector button 65 is located on said central portion 25, however, selector button 65 as power button 64 may be located wheresoever on the housing 22. Selector button 65 variates a speed of the rotational motion generated by the motor 42. In a preferrable embodiment selector button 65 has three speed settings: slow speed, medium speed, and high speed. Power cell 66 is in the base portion 24. However, in other embodiments said power cell 66 may be located wheresoever in the housing 22. Power cell 66 supplies electrical energy to the motor 62 for it to generate rotational motion. Charging port 67 permits to charge the power cell 66 using a charging cord 68. The charging port 67 may be an USB-A type port, an USB-C type port, a lightning type port, a micro-USB type port or any variation thereof. The charging port 67 may be connected to the power cell 66. Charging cord 68 is a cable used to charge the power cell 66. Charging cord 68 is connected to the charging port 67 and to an electric power source.

Electrical assembly 60 further includes a remote controller 69. Said remote controller 69 activates the motor 62 remotely. Remote controller 69 also permits to vary the speed and the direction of the motor rotational motion remotely.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A foot therapy device, comprising:

a) a base assembly including a housing and an attaching member, said housing includes a base portion, a central portion, and a top portion, and is coated with a material that resists liquid water passing through configuring a waterproof housing, said housing is capable of being adhered to a surface by means of the attaching member, said attaching member being a suction anchor located on a base surface of the base portion of said housing;

b) a foot file assembly including file members and a shaft mounted to each of the file members, said file members are configured to receive a sole of a foot, said file members are attached to said housing at the central portion with openings that receive said shafts, the file members are configured to massage a sole of a foot, said file members are also configured to remove calluses and dead skin from a sole of a foot, said file members having a truncated conic shape, defining a wide end and a narrow end, with the wide end attached to the shafts, and the narrow end extending outward from the housing, the file members and being made of pumice stone with predetermined grades of file that are case dependent, said file members being detachable from said central portion and replaceable with file members having bead rollers for massaging;

c) an electrical assembly including a motor, and a transmission system, a power cell, a power button, a selector button, a charging port, a charging cord, and a remote controller, the motor generates rotational motion that is carried by said transmission system to the file members permitting the file members to rotate clockwise or counterclockwise, said selector button variates a speed of the rotational motion generated by the motor with three speed settings: one for a slow speed, one for a medium speed and one for a high speed, said remote controller turns on and off the foot therapy device remotely and variates the speed of rotational motion generated by the motor.

2. The foot therapy device of claim 1, wherein said base portion has a cuboid shape.

3. The foot therapy device of claim 1, wherein said central portion is mounted onto the base portion and has an elongated cuboid shape.

4. The foot therapy device of claim 1, wherein said top portion is mounted onto said central portion.

5. The foot therapy device of claim 1, wherein said top portion further includes a top surface, said top surface has a plurality of convex protuberances which are volumetric configuring a cloud shape.

6. The foot therapy device of claim 1, wherein said central portion includes the openings, said openings receive the shafts for the file members to be attached therein.

7. The foot therapy device of claim 1, wherein said file members are made of pumice stone for removing dead skin and calluses.

8. The foot therapy device of claim 1, wherein said file members are made of bead rollers for massaging.

9. The foot therapy device of claim 1, wherein said file members are removable.

10. The foot therapy device of claim 1, wherein said electrical assembly further includes a power button, a selector button, a power cell, a charging port, a charging cord, and a remote controller.

11. The foot therapy device of claim 10, wherein said selector button variates a speed of the rotational motion generated by the motor, the selector button includes three speed settings: one for a slow speed, one for a medium speed, and one for a high speed.

12. The foot therapy device of claim 10, wherein said remote controller turns on and off the foot therapy device remotely, said remote controller variate the speed of rotational motion generated by the motor and transmitted to the file members.

13. The foot therapy device of claim 1, wherein said attaching member is a suction anchor.

14. A foot therapy device, comprising:

a) a base assembly including a housing and an attaching member, said housing is coated with a material that resist liquid water passing through configuring a waterproof housing, said housing having a base portion, a central portion, and a top portion, said central portion having openings, said housing is capable of being adhered to a surface by means of the attaching members, the attaching member is a suction anchor;

b) a foot file assembly including file members and a shaft mounted to each of the file members, said file members are configured to receive a sole of a foot, the file members have a truncated conic shape, defining a wide end and a narrow end, with the wide end attached to the shafts, and the narrow end extending outward from the housing, said shafts are introduced in the openings for attaching the file members, file members are made of pumice stone for removing calluses and dead skin, for massaging a sole of a foot the file members made of pumice stone are capable of being detached from the central portion and being replaced by file members having bead rollers for massaging made of bead rollers; and c) an electrical assembly including a motor, a transmission system, a battery, a power button, a selector button, a charging port, and a charging cord, the motor generates a rotational motion that is carried by said transmission system, the transmission system is connected internally to said openings, the file members coupled to said openings are then capable of rotating clockwise or counterclockwise, the power button activates or deactivates the motor by impeding or permitting the flow of electrical energy coming from the battery to the motor, the selector button variates a speed of the rotational motion generated by the motor, the selector button includes three speed settings: one for a slow speed, one for a medium speed, and one for a high speed, the charging port is connected to said battery, the charging port and the charging cord are for charging the battery externally.

15. The foot therapy device of claim 14, wherein said electrical assembly includes a remote controller, said remote controller turns on and off the foot therapy device remotely, said remote controller variate the speed of rotational motion generated by the motor and transmitted to the file members.

16. A foot therapy device, consisting of:

a) a base assembly including a housing and an attaching member, said housing is coated with a material that resist liquid water passing through configuring a waterproof housing, said housing having a base portion, a central portion, and a top portion, said central portion having openings, said housing is capable of being adhered to a surface by means of the attaching member, the attaching member is a suction anchor, the attaching members are located on a base surface of the base portion, the top portion further includes a top surface, said top surface has a plurality of convex protuberances which are volumetric configuring a cloud shape;

b) a foot file assembly including file members and a shaft mounted to each of the file members, said file members are configured to receive a sole of a foot, the file members have a truncated conic shape, defining a wide end and a narrow end, with the wide end attached to the shafts, and the narrow end extending outward from the housing, said shafts are introduced in the openings for attaching the file members, file members are made of pumice stone for removing calluses and dead skin, for massaging a sole of a foot the file members made of pumice stone are capable of being detached from the central portion and being replaced by file members having bead rollers for massaging made of bead rollers; and c) an electrical assembly including a motor, a transmission system, a battery, a power button, a selector button, a charging port, a charging cord, and a remote controller, the motor generates a rotational motion that is carried by said transmission system, the transmission system is connected internally to said openings, the file members coupled to said openings are then capable of rotating clockwise or counterclockwise, the power button and the selector button are located on the central portion, the power button activates or deactivates the motor by impeding or permitting the flow of electrical energy coming from the battery to the motor, the selector button variates a speed of the rotational motion generated by the motor, the selector button includes three speed settings: one for a slow speed, one for a medium speed, and one for a high speed, the charging port is located on the base portion, the charging port is connected to said battery, the charging port and the charging cord are for charging the battery externally, said remote controller turns on and off the foot therapy device remotely, said remote controller variate the speed of rotational motion generated by the motor and transmitted to the file members.

* * * * *